J. LARSON.
PROPELLING DEVICE FOR BOATS.
APPLICATION FILED NOV. 14, 1918.
1,320,697.
Patented Nov. 4, 1919.
5 SHEETS—SHEET 2.
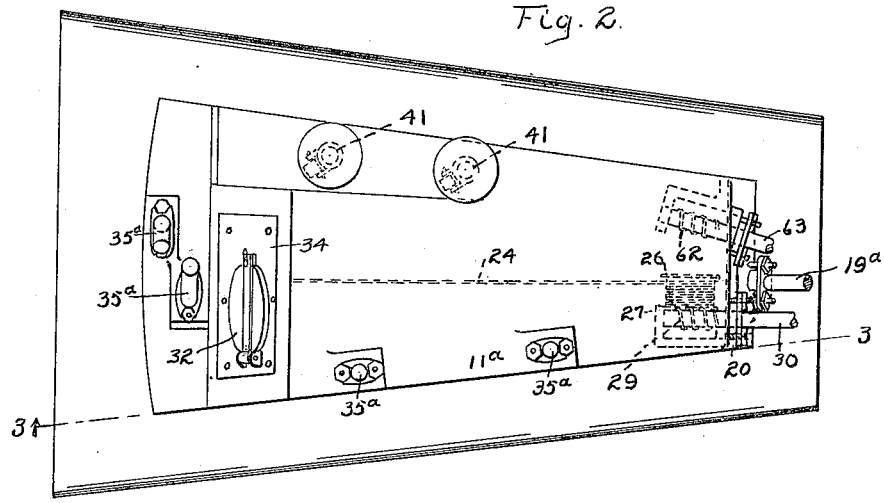
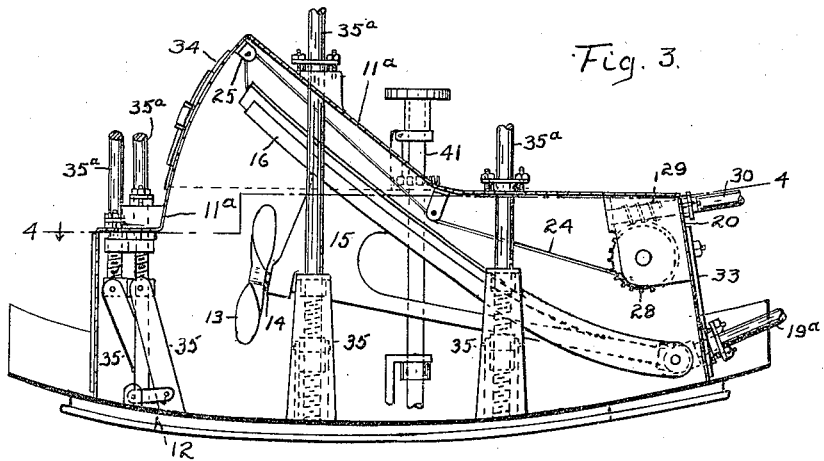
John Larson
INVENTOR.
BY Elwin M Hulse
ATTORNEY.

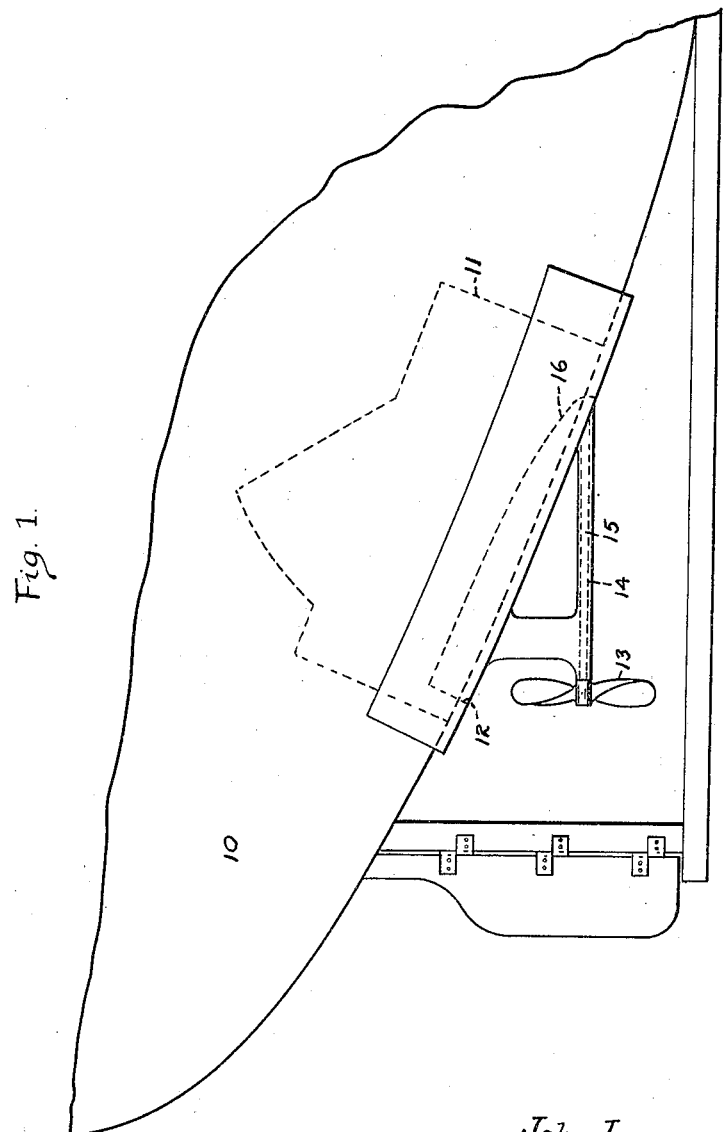

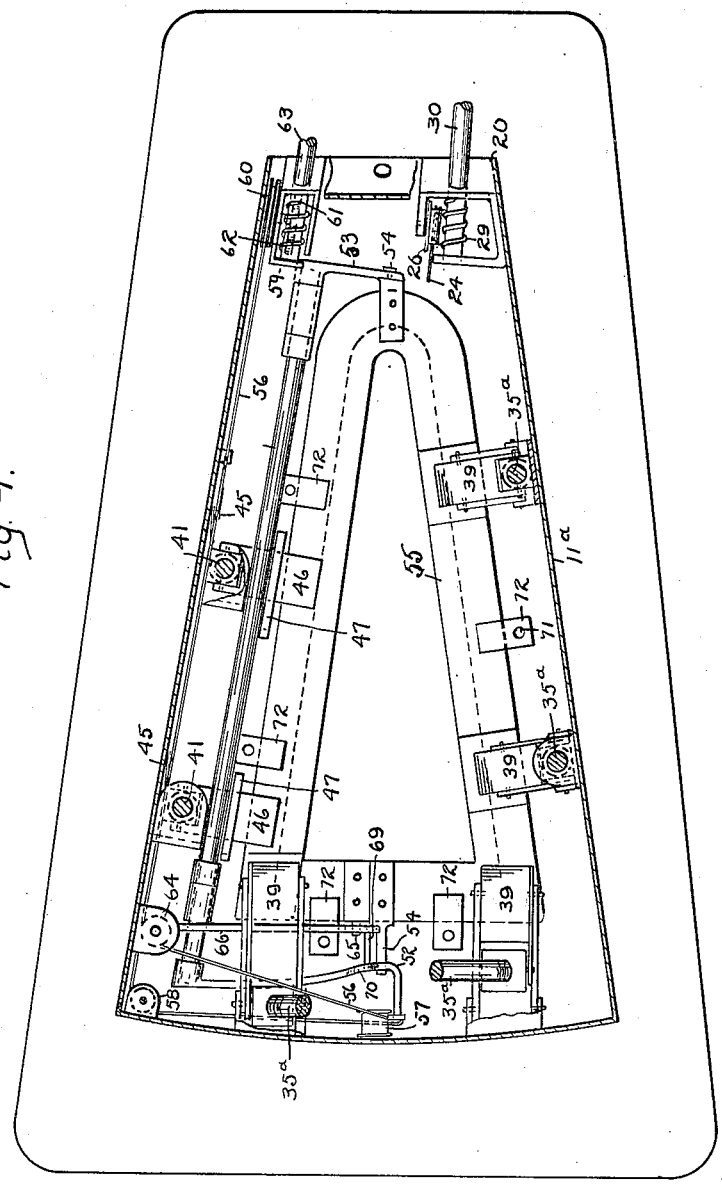

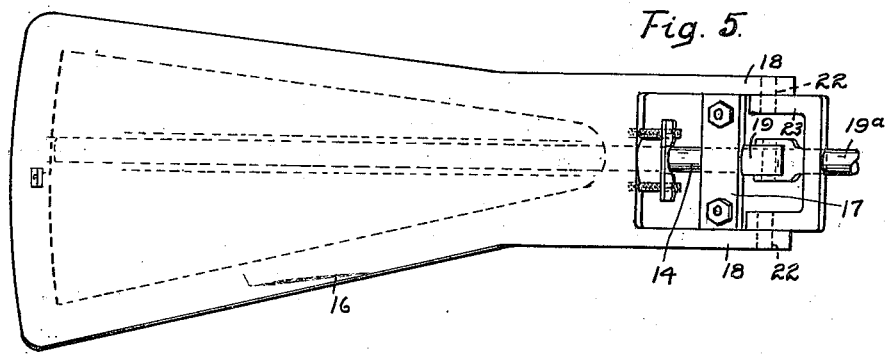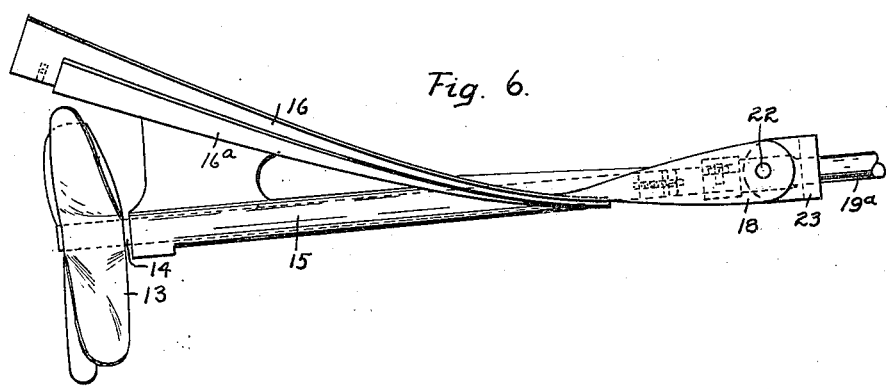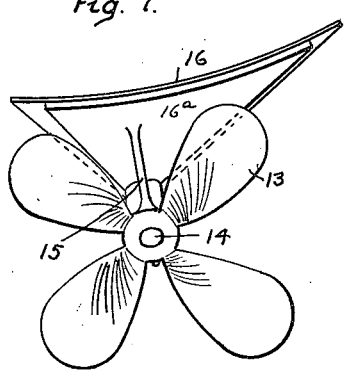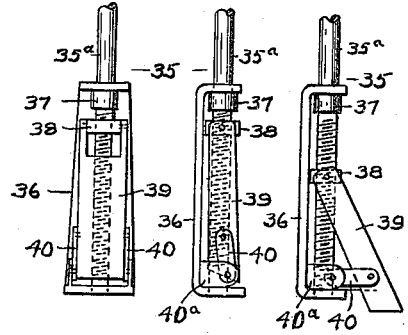

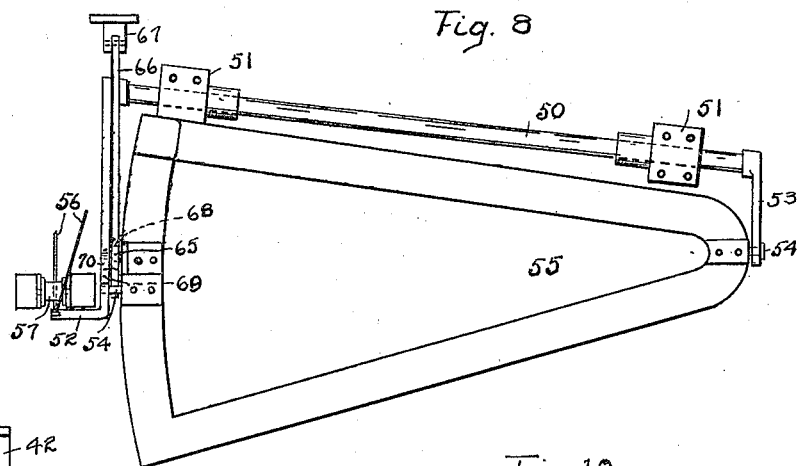
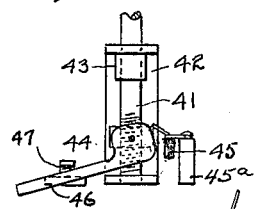
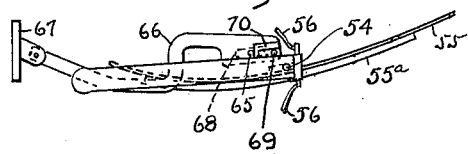
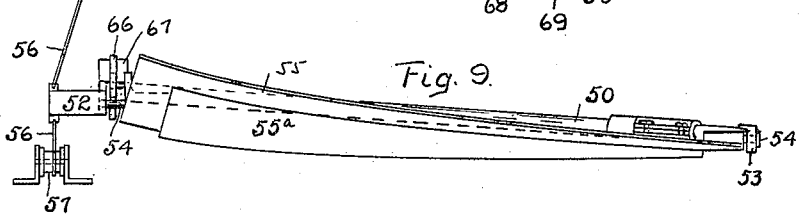
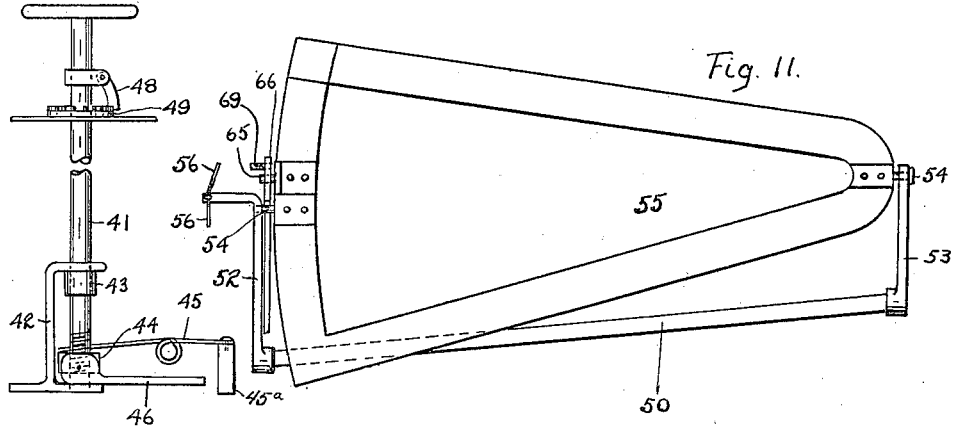
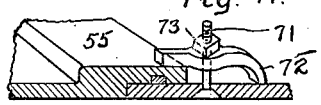

UNITED STATES PATENT OFFICE.

JOHN LARSON, OF TACOMA, WASHINGTON.

PROPELLING DEVICE FOR BOATS.

1,320,697.  Specification of Letters Patent.  Patented Nov. 4, 1919.

Application filed November 14, 1918. Serial No. 262,438.

*To all whom it may concern:*

Be it known that I, JOHN LARSON, a citizen of the United States, residing at Tacoma, in the county of Pierce and State of Washington, have invented new and useful Improvements in Propelling Devices for Boats, of which the following is a specification.

The invention relates to devices for propelling boats, and especially to such devices for propelling schooners, or other vessels equipped with sails. When there is a good wind the vessel is of course propelled thereby, but when the wind is poor or there is a calm the vessel makes little or no progress. To enable the vessel to be propelled in a poor wind or in a calm it is necessary to provide the vessel with an auxiliary power plant and propeller or propellers. When the propeller is not in use and the vessel is being propelled by the wind the propeller, being without the boat, is necessarily dragged through the water. This dragging of the propeller or propellers in the water retards the progress of the boat appreciably.

The object of the invention is to provide a propelling device for a boat which, when not in use, may be taken into the vessel. Another object is to provide means within the vessel into which the propelling device is received and in which repairs may be made to the device, such as the repair of the propeller or shaft.

I accomplish the invention by providing the vessel with a water tight compartment into which the propelling device is taken when not in use, the device being pivoted within the compartment and adapted to be lowered therefrom into the water or elevated from the water into the compartment, the compartment having communication with the water and having means for closing the communication.

In the accompanying drawings I have illustrated an embodiment of the invention in which—

Figure 1 is a fractional elevational view of the stern of a boat provided with the invention.

Fig. 2 is a plan view of the water tight compartment and showing the portions of the operating mechanisms which project outside the compartment.

Fig. 3 is a side elevational view of the same taken on line 3—3 of Fig. 2.

Fig. 4 is a horizontal sectional view of the same on line 4—4 of Fig. 3, the propeller mechanism being omitted.

Fig. 5 is a plan view of the combined propeller mechanism and closure member.

Fig. 6 is a side elevational view of the same.

Fig. 7 is an end elevational view of the same.

Fig. 8 is a plan view of the second closure member.

Fig. 9 is a side elevational view of the same.

Fig. 10 is an end elevational view of the same.

Fig. 11 is a view of the same in elevated and laterally swung position.

Fig. 12 is a side elevational view of one of the clamping devices for the closure members.

Fig. 13 is a front elevational view of the same in the inactive position.

Fig. 14 is a front elevational view of another clamping device for the closure members in the inactive position.

Fig. 15 is a side elevational view of the same.

Fig. 16 is a side elevational view of the latter clamp in clamping position.

Fig. 17 is a perspective view of a third form of clamp for the closure members.

Fig. 18 is a perspective view of the cleat coöperating with the clamping device illustrated in Figs. 12 and 13.

In the drawings I have illustrated the invention as applied to one of the twin screws of a twin screw vessel, but it will be understood that the device may be applied to a single screw vessel as well.

Referring to the drawings 10 indicates the vessel, 11 the water tight compartment attached to inner side wall of the vessel, 12 an opening in said wall establishing communication between the compartment and the exterior of the vessel, 13 the propeller secured to a shaft 14 revolubly mounted in a frame 15 secured to or integral with plate or closure 16 adapted to close opening 12. The shaft projects from the plate at the proper angle to properly position the propeller for driving the vessel and the plate is given the proper curvature both longitudinally and transversely to correspond to the curvature of the side of the vessel in which opening 12 is formed. The forward end of shaft 14 projects through the plate and into and through a suitable bearing 17 suitably formed on or secured to members 18 which extend forwardly from the forward end of the plate. One half of a knuckle joint 19 is formed on the forward end of the shaft, the other half of the joint being formed on the rear end of the driving shaft 19ª leading from the engine and passing through the front wall 20 of the housing 21 which housing is mounted on the side of the vessel over opening 12 and forms the water tight compartment 11. The forward ends of members 18 are pivoted at 22 to a suitable bearing 23 secured to the side of the vessel or front wall 20 of the housing. The plate, together with the propeller and its connected shaft 14, is pivotally mounted on bearing 23 and may be raised or lowered thereon to place the propeller in the water or to withdraw the same into the housing. For raising and lowering the propeller unit I attach to the rear end of plate 16 a chain 24, pass the same over a sheave 25 suitably supported above the plate, as from the top wall of the housing 11ª, and connect the forward end of the chain to the drum 26 of winch 27 revolubly mounted within the compartment 11. Worm gear 28 is connected to drum 26 and worm 29 mounted on shaft 30 meshes with the gear for rotating the drum for winding up or unwinding the chain to raise or lower the propeller unit. Shaft 30 projects forwardly through the front wall 20 of the housing, suitable stuffing boxes being provided to prevent leakage of water into the hold of the vessel. Shaft 30 is rotated by any suitable means.

Suitable packing 31 is inserted in a channel formed in the lower face of plate 16 which makes the joint between said plate and the side of the vessel about opening 12 water tight when the plate is secured in place as hereafter described. The compartment 11 is high enough to permit the propeller to be drawn wholly within the compartment. A suitable man-hole and cover 32 is formed in the rear wall of the housing to afford access to the interior of the compartment 11 and the end plates 33 and 34 of the housing may be detachably secured thereto so as to be capable of removal for access to the compartment for repairs to the mechanisms therein.

In order that the propeller unit shall be held firmly in place when in the water and that the plate 16 shall be held firmly in contact with the side of the vessel to make the joint between the same water tight, I provide a series of screw clamps 35 revolubly mounted in brackets 36 secured to the side of the vessel or bottom of the compartment 11 and the side wall and end wall of the compartment respectively. The clamps are of identical construction hence I will describe but one of them. The clamp consists of a threaded shaft 35ª which is revolubly mounted in the bracket 36 but which is prevented by collar 37 thereon from having any longitudinal movement A traveling member or nut 38 is mounted on the threaded portion of the shaft and a clamping member 39 is pivoted to opposite sides of member 38. Near the lower end of member 39 are pivoted to opposite sides thereof two links 40, the opposite ends of the links being pivoted to a bracket 40ª secured to or part of bracket 36. As shaft 35ª is rotated by suitable means in the proper direction traveler 38 descends on the shaft, the links forcing the lower end of clamp member 39 outwardly and into contact with the face of plate 16. The tightening of the clamp member on the plate, by the continued rotation of the shaft forces the plate into tight contact with the adjacent surface of the side of the vessel. Clamps 35 are used on one side and the rear end of the compartment and on the other side I prefer to use the clamp shown in Figs. 12, 13 and 18, in which 41 is a shaft mounted in bracket 42 secured to the bottom of the compartment, the shaft being revoluble and held from longitudinal movement by collar 43. Block 44 is in threaded engagement with the shaft and spring 45 is connected at one end to block 44 and at its other end to fixed block 45ª. The spring tends to rotate shaft 41 from right to left (Fig. 13) and to force latch 46 pivotally connected to block 44, under cleat 47 secured to the bottom of the compartment. The upper end of shaft 41 projects exteriorly of compartment 11 and secured to the top of the compartment and surrounding shaft 41 is a rack 49 adapted to be engaged by pawl 48 pivotally mounted on the shaft, by which pawl and rack latch 46 is held in the inactive position shown in Fig. 13. After latch 46 is engaged under cleat 47 shaft 41 is further rotated (pawl 48 having been disengaged from rack 49) to cause block 44 to rise on the shaft and convert the latch into a lever, the free end thereof being pressed down on plate 16 and cleat 47 being a fulcrum.

When the propeller is withdrawn from the water and taken into compartment 11 opening 12 must be closed, to accomplish which I provide a plate 55 similar to plate 16 but support it in a different manner, as follows: Shaft 50 is revolubly mounted in suitable bearings 51 secured to the bottom of the compartment and at each end of the shaft is an arm 52, 53 which are pivotally connected at their free ends to pivots 54 secured to opposite ends of plate 55. The end of arm 52 is extended laterally and the ends of a chain 56 are connected to the free extremity thereof. The chain passes under a sheave 57 supported on the bottom of the compartment adjacent the rear wall thereof, and then passes over a sheave 58 suitably supported on the rear wall of the compartment and it then passes adjacent the adjacent side wall of the compartment to and over a winch 59 the drum 60 of the winch having a suitable surface to engage the links of the chain and prevent slippage of the same thereon. The drum is driven by a worm gear 61 and worm 62, worm 62 being secured to shaft 63, which shaft projects through the front wall of the compartment and is driven by any suitable means. Chain 56 passes from drum 60 over a sheave 64 suitably supported on the side wall of the compartment and at a suitable point above opening 12, and from sheave 64 the chain is passed to and connected to the laterally extending end of arm 52. The several sheaves are properly positioned so that when the winch is operated in one direction the chain will lift the rear end of the plate, and since both ends of the plate are pivoted to arms 52 and 53 of shaft 50, the plate will swing toward the side of the compartment adjacent shaft 50. In order that the plate, when lifted up, shall pass out from under the propeller and its plate 16 and permit the latter to be lowered, I form a second pivot 65 on the rear end of plate 55 at one side of and above pivot 54. A bar 66 is pivoted at one end to a suitable bearing 67 secured to the side wall of the compartment and near the opposite end of the bar is a slot 68 which receives pivot 65. A pin 69 projects rearwardly from bar 66 and engages under a cleat 70 projecting from the top surface of arm 52. The engagement of the pin 69 and cleat 70 occurs only when plate 55 is in its closing position over opening 12.

For the purpose of furnishing additional security for the plates 16 and 55 when closing opening 12, respectively, I provide at suitable intervals in the bottom of the compartment a number of threaded posts or bolts 71 and loosely mount thereon cleats 72, which cleats when moved or swung over the plate are tightened down thereon by suitable members or nuts 73 on the bolts. The operation of securing the cleats 72 in place is, preferably, carried on by hand.

A pump, (not shown) will be connected to the interior of the compartment, at some convenient point, for removing the water that enters the same when opening 12 is uncovered by either of the plates 16 or 55. When the water has been removed from the compartment access to the compartment is gained through the man-hole for adjusting cleats 72 and for making repairs to the mechanisms within.

In operation and starting with plate 55 closing opening 12 and plate 16 and the attached propeller mechanism wholly within the compartment, and it is desired to make use of the propeller for driving the vessel, cleats 72 are first detached, then the several screw clamps and latches are released and winch 59 is operated in the proper direction to elevate the plate 55 and rotate it on its pivots toward the side of the compartment and until it reaches a position substantially at right angles to the position it occupied when closing opening 12, the rotation of the plate being accomplished by bar or lever 66. Water, of course, enters the compartment through opening 12. Winch 27 is then operated in the proper direction to lower plate 16 and the propeller mechanism out through opening 12 and into the water. Plate 16 seats in the opening and the several screw clamps and latches are tightened down upon the plate and the water is then pumped out and the clamping cleats 72 are then fixed in place.

The shaft 14 of the propeller is now in line with shaft 19$^a$ and the propeller is now in position to be driven. The operation is reversed when it is desired to withdraw the propeller from the water.

It is apparent that the curvature of the plates 16 and 55 both longitudinally and transversely will correspond to the curvature of the side of the vessel against which it contacts and also that the depending central portion of each plate indicated by 16$^a$ and 55$^a$ corresponds in depth to the thickness of the side of the vessel so that the outer surface of said portion shall coincide with the outer surface of the said side of the vessel when the plate is in the closing position with respect to opening 12. The water-tight compartment and all the various mechanisms above described are duplicated for each propeller on the vessel.

What I claim is:

1. The combination with a boat having an opening in a wall thereof, of a water-tight compartment having communication through the opening with the exterior of the boat, a main shaft projecting into the compartment, an auxiliary shaft pivotally connected to the main shaft and movable through the opening into and out of the compartment, a propeller secured to the auxiliary shaft, a support for the auxiliary shaft pivotally mounted within the compartment and adapted to close the opening and to limit the outward movement of the auxiliary shaft and propeller, and means to secure the support at the opening in the closing position thereof.

2. The combination with a boat having an opening in a wall thereof, of a water-tight compartment within the boat and having communication through the opening with the exterior of the boat, a main shaft projecting within the compartment, a plate pivotally mounted within the compartment and adapted to close the opening, an auxiliary shaft supported by the plate and pivotally connected at one end to the main shaft, a propeller secured to the opposite end of the auxiliary shaft, means to move the plate on its pivot for causing it to close the opening and to cause the auxiliary shaft and propeller to move through the opening to the exterior of the boat and means to rigidly secure the plate about the opening in the closing position thereof.

3. The combination with a boat having an opening in a wall thereof, of a water-tight compartment within the boat and having communication through the opening with the exterior of the boat, a plate pivotally mounted within the compartment and adapted to close the opening, a propeller revolubly supported by the plate and adapted to be moved through the opening into the compartment or to the exterior of the boat, a main shaft having a pivotal connection to the propeller for rotating the same, means to move the plate on its pivot toward and from the opening and to cause the propeller to move bodily outwardly and inwardly through the opening and means to secure the plate in its closing position at the opening.

4. The combination with a boat having an opening in a wall thereof, of a water-tight compartment within the boat and having communication through the opening with the exterior of the boat, a pivotally mounted member within the compartment adapted to close the opening, a propeller revolubly supported by the pivotally mounted member and adapted to be lowered through the opening to the exterior of the boat, a driving shaft pivotally connected to the propeller, means to close the opening when the propeller is within the compartment consisting of a plate, a rock shaft having pivotal connection with opposite ends of the plate, a lever having a sliding connection to the plate and means to move the plate and rock the rock shaft, the lever causing the plate to turn on its longitudinal axis through an angle of substantially ninety degrees, and means to secure the pivotally mounted member and the plate at said opening respectively.

5. The combination with a boat having an opening in a wall thereof, of a water-tight compartment within the boat and having communication through the opening with the exterior of the boat, a combined propeller mechanism and closing member for the opening pivotally mounted within the compartment and adapted to be moved to cause the closing member to close the opening and the propeller to move through the opening to the exterior of the boat and means to close the opening when the combined propeller mechanism and closing member are wholly within the compartment consisting of a plate adapted to engage in and cover the opening, means to elevate and lower the plate and means to cause the plate to move laterally and to turn on edge or from the latter position to a horizontal position while it is being elevated or lowered.

6. The combination with a boat having an opening in a wall thereof, of a water-tight compartment within the boat and having communication through the opening with the exterior of the boat, a main shaft projecting into the compartment, a closing member pivotally mounted within the compartment and adapted to be moved on said pivot to close or clear the opening, a propeller revolubly supported by the closing member and having a pivotal connection to the main shaft and adapted to be moved through the opening into and out of the compartment, a winch to raise and lower the closing member and propeller, a member adapted to close the opening when the propeller is within the compartment, a winch to raise and lower the member, means pivotally connected to the member for causing the member to swing in the arc of a circle and means having a connection to the member for causing it to turn on its longitudinal diameter through an angle of approximately ninety degrees, and a plurality of clamps for rigidly securing the closing means and said member at the opening respectively.

7. The combination with a boat having an opening in a wall thereof, of a water-tight compartment within the boat and having communication through the opening with the exterior of the boat, a main shaft projecting into the compartment, a propeller pivotally supported within the compartment and having a pivotal connection to the main shaft, and being adapted to be lowered and elevated through the opening and means to close the opening when the propeller is within the compartment consisting of a plate adapted to seat in and about the opening, means connected to the plate for raising and lowering it from and toward the opening, means connected to the plate for causing it to move laterally out of the path of the ascending or descending propeller and a plurality of clamps having operative means without the compartment for rigidly securing the plate in and about the opening.

8. The combination with a boat having an opening in a wall thereof, of a propeller pivotally mounted within the boat and adapted to be lowered through the opening into the water exteriorly of the boat, means to close the opening when the propeller is without the boat, means to close the opening when the propeller is within the boat, means secured to said wall of the boat forming a water-tight compartment about the opening, and a screw-clamp for securing either closing means at the opening consisting of a threaded shaft revolubly mounted within the compartment and projecting to the exterior thereof, a traveler mounted on the shaft, a plate engaging member pivotally connected to the traveler and means connected to the engaging member for moving its lower end away from the shaft and toward the plate as the shaft is rotated to cause the traveler to descend.

In witness whereof I have hereunto set my hand this 25th day of October, 1918.

JOHN LARSON.

Copies of this patent may be obtained for five cents each, by addressing the "Commissioner of Patents, Washington, D. C."